Jan. 17, 1956     E. W. MILLER     2,730,929
WORK AND CUTTER SPINDLE POSITIONING MECHANISM
Filed July 9, 1951                              6 Sheets-Sheet 4

*INVENTOR.*
EDWARD W. MILLER.
BY John Morton
HIS ATTORNEY

Jan. 17, 1956 E. W. MILLER 2,730,929
WORK AND CUTTER SPINDLE POSITIONING MECHANISM
Filed July 9, 1951 6 Sheets-Sheet 5
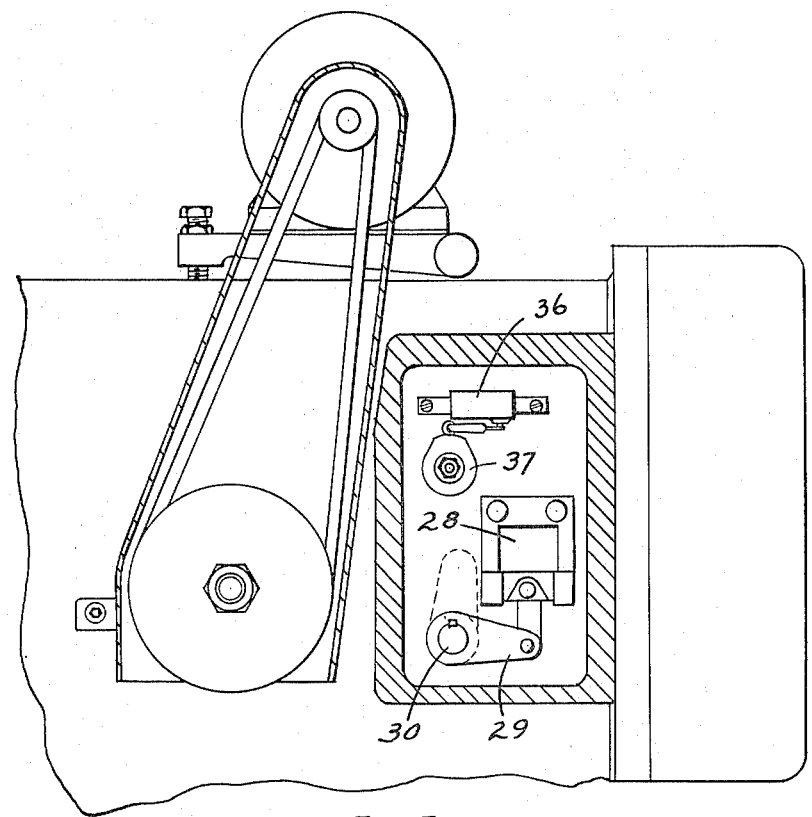
FIG. 5.
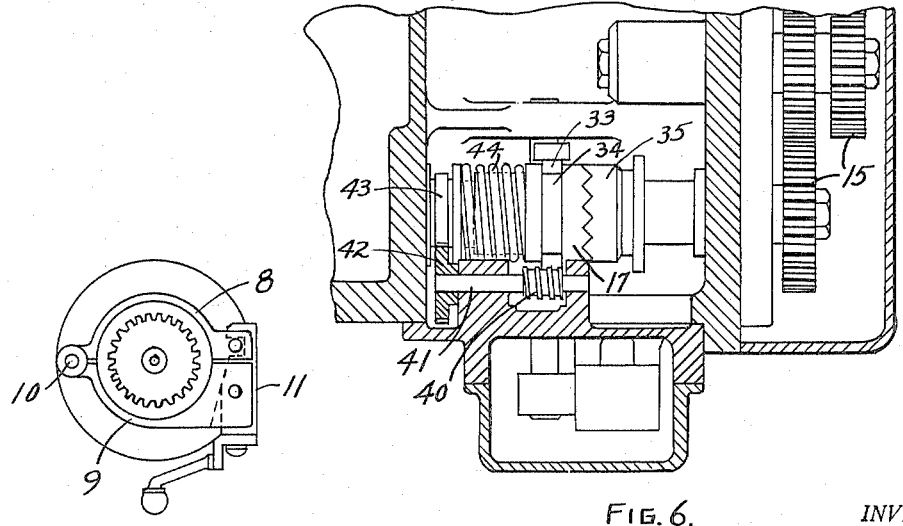
FIG. 6.
FIG. 7.
INVENTOR.
EDWARD W. MILLER.
BY John Morton
HIS ATTORNEY.

Jan. 17, 1956  E. W. MILLER  2,730,929
WORK AND CUTTER SPINDLE POSITIONING MECHANISM
Filed July 9, 1951  6 Sheets-Sheet 6

INVENTOR.
EDWARD W. MILLER.
BY John Morton
HIS ATTORNEY

United States Patent Office 2,730,929
Patented Jan. 17, 1956

2,730,929

WORK AND CUTTER SPINDLE POSITIONING MECHANISM

Edward W. Miller, Springfield, Vt., assignor to The Fellows Gear Shaper Company, Springfield, Vt., a corporation of Vermont Application July 9, 1951, Serial No. 235,803

8 Claims. (Cl. 90—7)

The present invention is concerned with a gear shaper and, more specifically, a gear shaper for forming gears and other similar shaped objects in which means is provided for positively positioning a work spindle, and also a means is employed to position the cutter spindle so that long pieces of work may be formed.

A primary object of the invention herein concerned is to position a work carrying spindle after a work piece has been formed on the spindle so as to locate the spindle in the same rotative position when a second work piece is placed on the spindle and is ready to be cut. This work spindle locating means is frequently desirable for many purposes and is necessary when a work holding fixture is used which is of the hinge type where an operating handle must be readily accessible by the machine operator in order to load the fixture. Such work holding fixtures are used frequently when long work pieces are to be formed in the machine.

A second object is to provide a means for moving the cutter away from its normal operating position so that a work piece may be readily placed in the work fixture without interference from the cutter. Another object is to time the movement of the cutter moving means with the work positioning means so that the cutter will be moved away from an interfering position when the work spindle is in position to be loaded.

Another object is to eliminate insofar as is possible any necessity for the work spindle and cutter spindle to be manually adjustable and to provide means to carry out the desired functions automatically and in timed relation to the operation of the machine and to each other.

In the generation of gears and other similar objects which may be generated by the harmonious rotation of the work piece and a cutter, it is often necessary due to the time required to feed the cutter into depth in the work to rotate the work spindle through slightly more than one complete revolution. After a complete revolution of the work relative to the cutter, a slight additional rotative movement must be given to the work spindle to form all of the teeth completely and to the required depth. When a hinge type or similar fixture is employed, such an additional movement would eventually render the operating handle for the fixture inaccessible by the operator, and means is provided herein to reposition the work spindle after each piece is formed.

In the drawings,

Figure 5 is a partial section taken along the line 5—5 of Figure 1.

Figure 6 is a partial section taken along the line 6—6 of Figure 3.

Figure 7 is a partial view of the work fixture taken along the line 7—7 of Figure 1.

The same numerals are used throughout to designate the same elements in all the figures.

Figure 1:
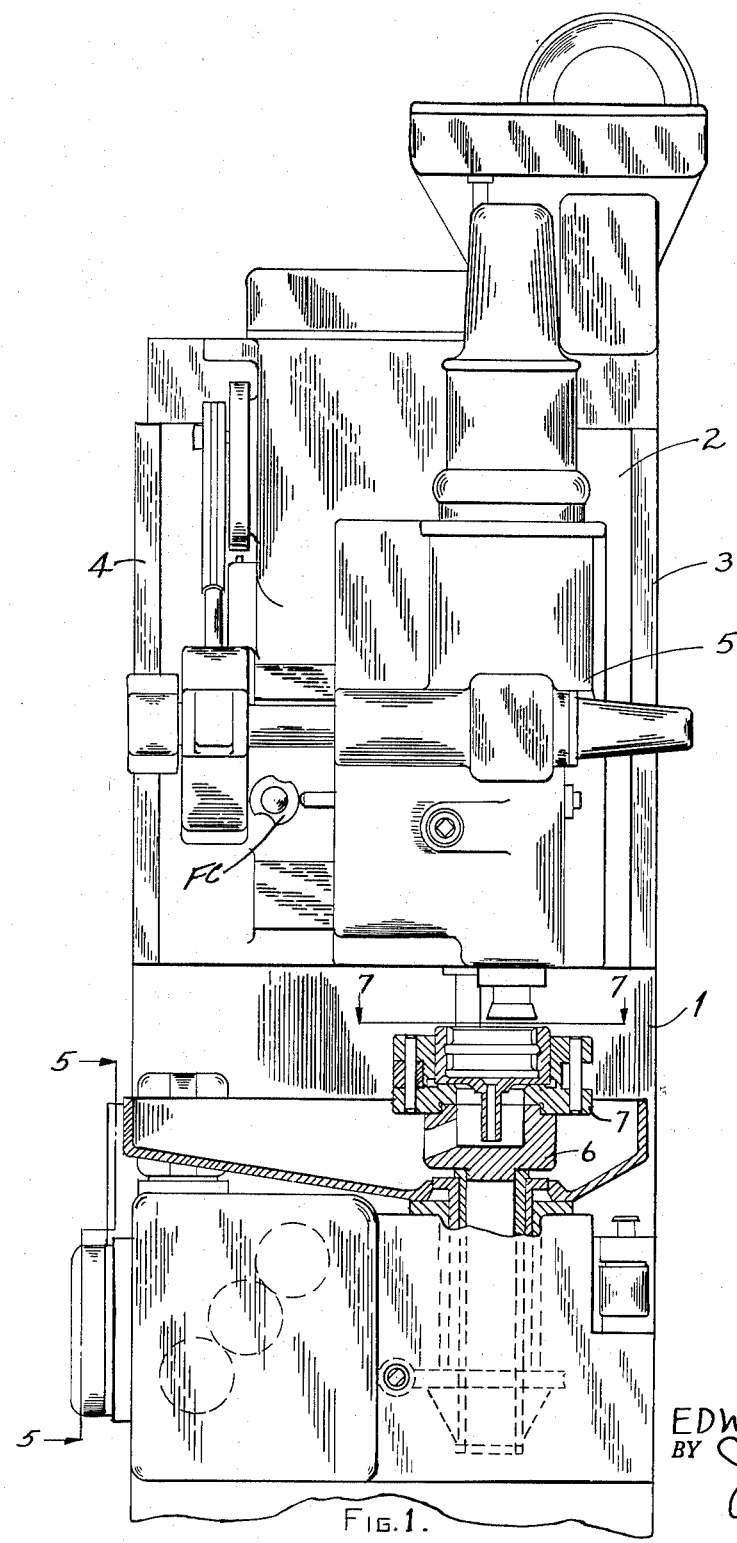
Figure 1 is a front elevation of the machine.
Figure 2:
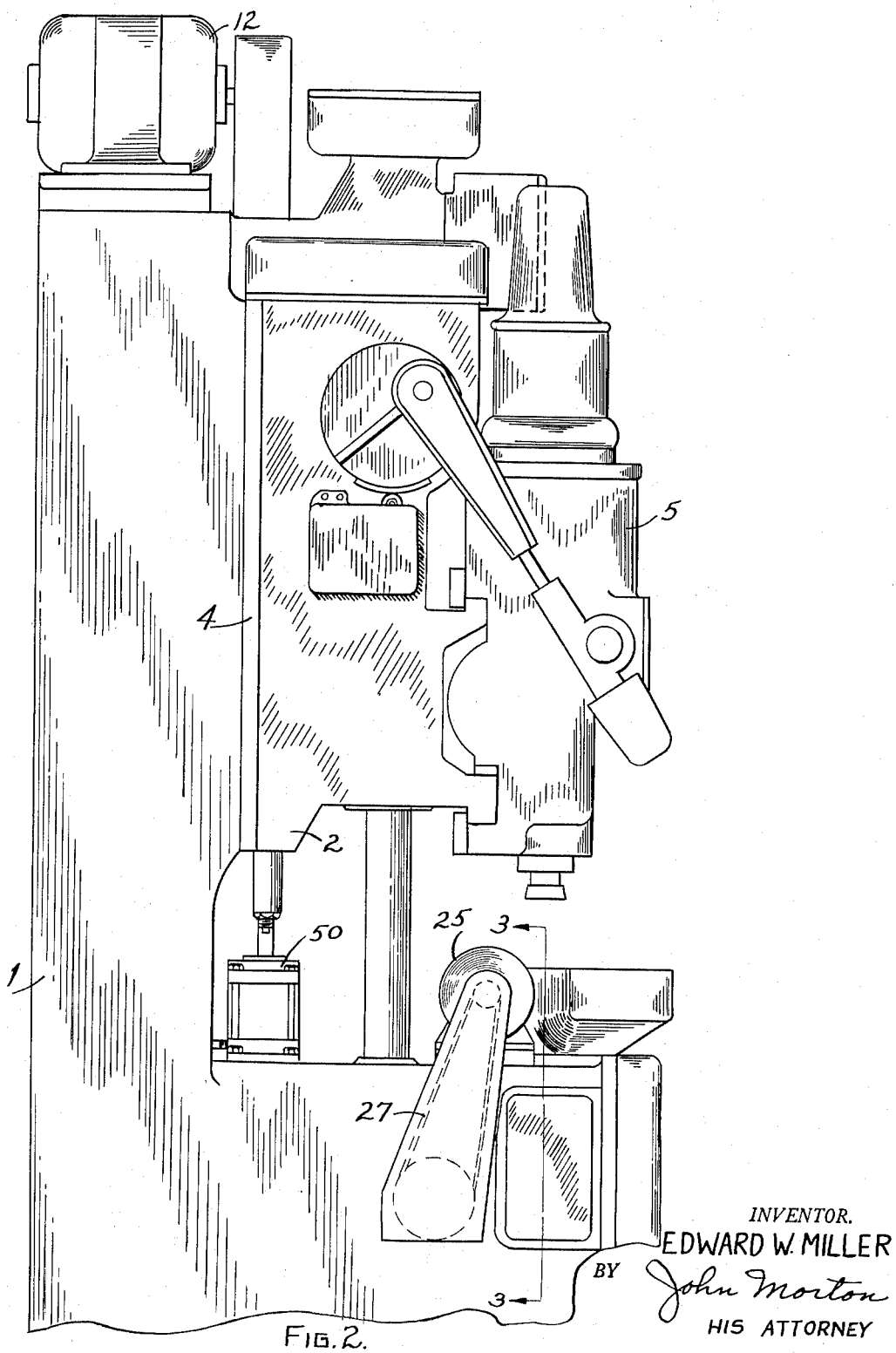
Figure 2 is a left end side elevation of the machine.

The machine herein concerned consists of a frame member 1. On this frame member is mounted a sub-base 2 which slides vertically on guideways 3 and 4. This sub-base 2 carries a cutter spindle saddle 5 in which is mounted the usual gear shaper cutter spindle. This cutter spindle is reciprocated in the customary manner and is rotated by the usual worm and wheel arrangement.

In the frame member 1 is journaled a work spindle 6 on which is mounted a work holding fixture 7. This work holding fixture 7 is a hinged-type fixture which may be opened to allow placing of the work in the work spindle. It consists of two parts 8 and 9 which are hinged at the hinge pin 10. These two parts may be clamped together by any appropriate mechanism 11. A main motor 12 drives the cutter spindle and work spindle in the customary manner and both cutter and work spindle are driven by a worm and wheel arrangement similar to that shown in the Fellows Patent, 1,478,472. The worm wheel 13 corresponds to the worm wheel 21 of said patent. The worm 14 which drives said worm wheel 13 is driven from feed gears 15 which are driven in timed relation to the cutter spindle in substantially the same manner as described in the above mentioned patent. Feed gears 15 are necessary and are provided so as to change this timed relation in response to the needs of different work pieces being formed and different cutters being employed.

From the above it is clear that the main drive motor drives the feed gears 15 in the usual gear shaper manner.

Figure 3:
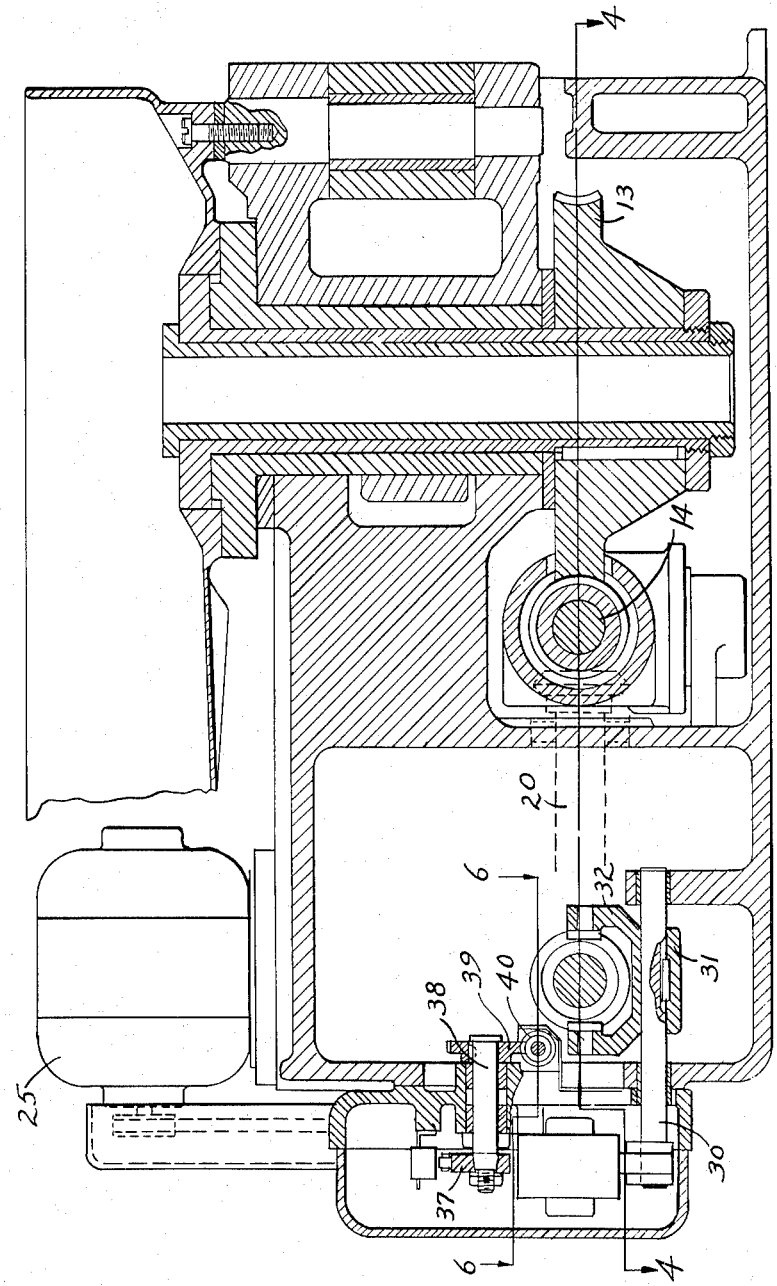
Figure 3 is a section taken along the line 3—3 of Figure 2.
Figure 4:
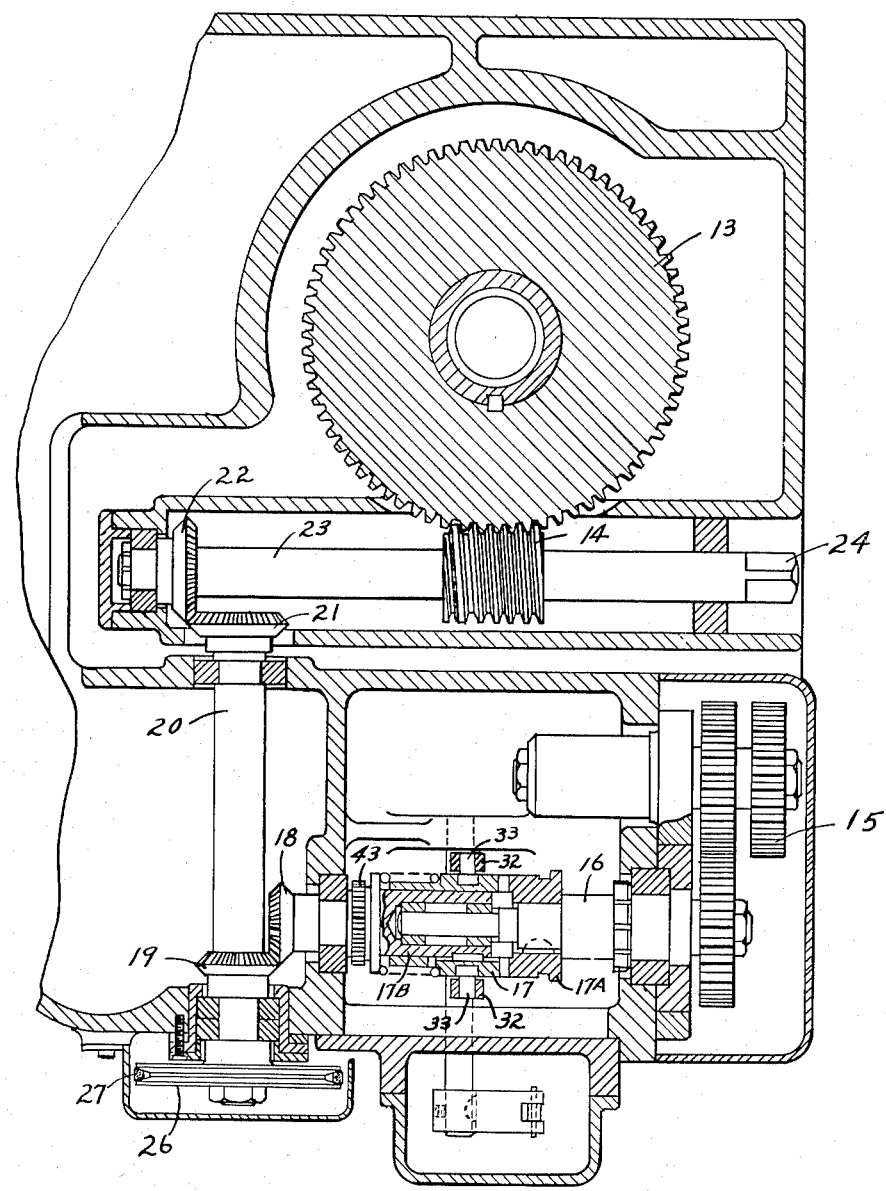
Figure 4 is a section taken along the line 4—4 of Figure 3.
Figure 8:
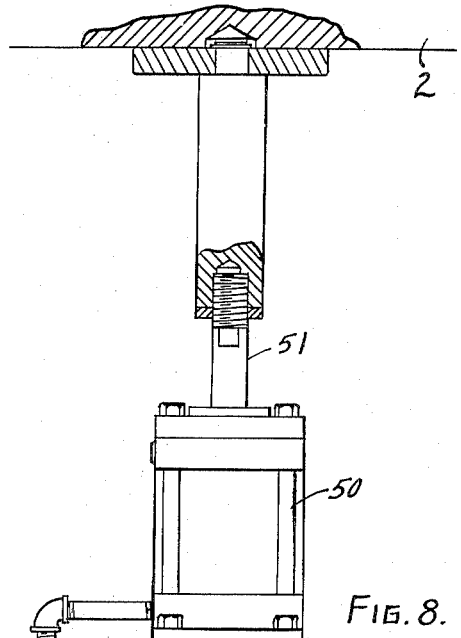
Figure 8 is an enlarged view showing the cylinder arrangement used to lift the cutter out of position.

As shown in Figures 3 and 4, the drive for the work spindle is taken from the feed gears 15 through the shaft 16, clutch 17, and bevel gears 18 and 19. The bevel gear 19 is fixed to a shaft 20 on which is mounted the bevel gear 21 which drives a bevel gear 22 fixed to the shaft 23 on which is mounted the worm 14. The shaft 23 may be formed at its outer end as shown at 24 so that a crank may be attached thereto to be rotated manually and to so move the work spindle.

As shown in Figure 4 the clutch 17 has one part 17A keyed to the shaft 16. The shaft 16 is formed with a reduced portion which is mounted to rotate in a second part 17B of the clutch 17. The parts 17A and 17B have interengaging teeth 35 formed thereon. When the cutting cycle of the machine is in operation, the interengaging teeth 35 are held firmly in engagement by the spring member 44. When the clutch teeth 35 are disengaged, the main drive from the feed gears 15 to the work spindle 6 will become inoperative.

On the frame member 1 is mounted a secondary drive motor 25 which serves to reposition the work spindle. This motor 25 drives a pulley 26 which is fixed to the shaft 20. The belt 27 drives the pulley 26 from the motor 25. As described below, a solenoid 28 which is electrically controlled is actuated to move a lever 29 which is keyed to the shaft 30. This shaft has keyed thereto a clutch actuating member 31 having arms 32 integral therewith. These arms 32 have pins 33 therein which engage a groove 34 formed in a portion of the clutch 17.

The clutch teeth 35 become disengaged when the solenoid 28 is actuated which will in turn move the lever 29 and the clutch actuating member 31 to force the part 17B to the left as shown in Figure 4 and Figure 6. Upon disengagement of the teeth 35 and the rendering of the main drive inoperative, the motor 25 is energized. When this motor becomes energized, it serves to drive the work spindle in the opposite direction to its normal rotation. The work spindle is rotated from the pulley 26 mounted on the outer end of the shaft 20 and geared to the worm 14 on shaft 23 through the medium of bevel gears 21 and 22.

After the motor 25 has rotated the work spindle in its reversed direction through a sufficient amount to restore it to its normal starting position, a microswitch 36 is actuated for deenergizing the motor 25. This microswitch 36 is actuated at the proper time through a cam member 37. The cam member 37 is mounted on a shaft 38 as shown in Figure 3. This shaft 38 has keyed thereto a gear 39 which meshes with the worm 40. The worm 40 is fixed to a shaft 41 which has keyed thereto a gear 42. This gear 42 meshes with a gear 43 which is formed on the part 17B of the clutch 17.

From the above construction it will be seen that when the clutch teeth 35 are disengaged, the motor 25 will drive the work spindle in a direction opposite to its normal direction of rotation. Also through the bevel gears 19 and 18, which are on the shaft 20 and fixed to the part 17B of the clutch 17 respectively, is actuated the cam 37 which is used to actuate the microswitch 36. Upon such actuation the motor 25 will become deenergized and after a time lag which is provided for electrically as described below, the clutch solenoid 28 will also become deenergized and the clutch teeth 35 reengaged under the urge of the spring 44.

In order to move the cutter spindle from a position which would not interfere with proper placement of the work spindle, a hydraulic cylinder 50 is provided. This cylinder 50 has a piston therein to which is fixed the piston rod 51. This piston rod 51 is fixed mechanically to the sub-base 2. When the sub-base 2 is raised or lowered, it will impart to the cutter spindle a movement in addition to its normal reciprocating movement. Movement is given to the sub-base 2 by admitting fluid to the cylinder 50. When this occurs, the rod 51 moves and serves to raise or lower the sub-base 2 and since the cutter spindle is mounted through the cutter saddle on the sub-base 2, the cutter spindle will correspondingly be actuated.

The various movements required may be obtained in a variety of ways from the various motors and switches described above, but shown in Figure 9 and Figure 10 is a way of accomplishing the desired results. The specific way of accomplishing the result is not a part of the present invention since to provide a suitable electrical hookup is within the scope of anyone skilled in the art. It is sufficient for the present disclosure to make clear that the machine is provided with suitable electrical and hydraulic connections to perform the action desired.

Figure 9:
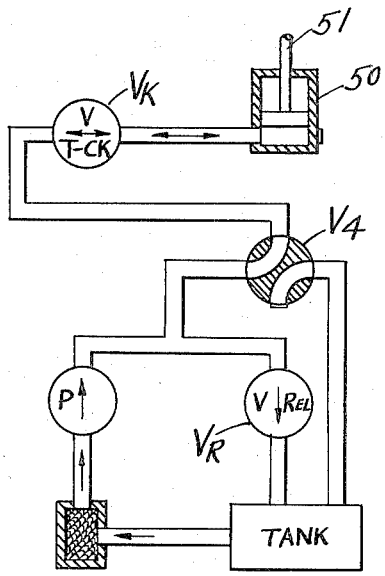
Figure 9 is a showing of the hydraulic circuit necessary to operate the cutter positioning cylinder.
Figure 10:
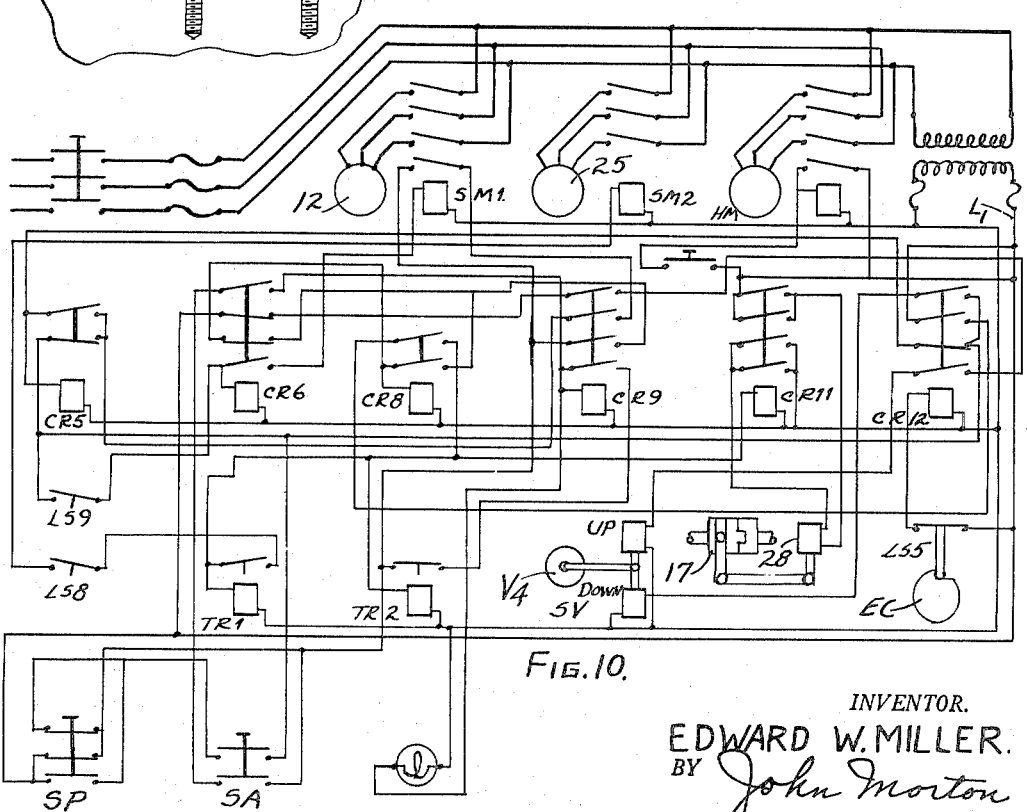
Figure 10 is a diagram showing one possible electrical circuit which may be employed to correlate the various movements herein concerned.

As shown in Figure 9, a pump P is provided which is driven constantly from a motor HM; this pump P forces fluid through the four-way valve V4 through check valve VK to the lower side of the cylinder 50. After valve V4 is rotated through a sufficient amount, fluid will flow from the bottom of the cylinder 50 back through the check valve VK through the valve V4 to the tank. A relief valve VR is provided so that when the valve V4 is in the position shown in Figure 9, to admit fluid to the bottom of the cylinder 50, a relieving action will occur when the sub-base is lifted to its upper limit. The four-way valve V4 is actuated by a two-way solenoid SV as shown in Figure 10.

An electrical cam EC is provided which is fixed to the same shaft as the customary feed cam FC.

The solenoid valve SV will stay in whichever position, either up or down, to which it is last moved until the opposing solenoid coil is energized.

If we assume that a work piece on the work spindle has been finished and the sub-base has been moved to its upper position, it becomes necessary to change the work piece. After the work piece has been changed, the operator presses the starter button SA as shown in Figure 10. When this is done, the feed cam FC is at the low point so that the gear shaper is ready to begin to feed. At the time of pressing the starting button SA, the down coil of valve SV is energized.

When the sub-base is lowered to its cutting position, limit switch LS9 closes and the coil of contactor CR6 becomes energized and the starter SM1 energizes and starts the main machine motor 12. At this time the coil of CR9 also becomes energized.

As the work is being cut, the electrical cam EC operates to open limit switch LS5 and this deenergizes the coil of contact CR12. When the coil of contact CR12 becomes deenergized, it energizes coil CR5 and the coils of SM1 and CR6 are held energized through the limit switch LS9, contactor CR12, contactor CR5, contactor CR9 and starting switch SM1 through the contact provided on the stop button SP. When the work is finished, limit switch LS5 closes and this energizes coil CR12 which opens starting switch SM1 and contactor CR6 which stops the cutter spindle stroking. At that time, the coil of the contactor CR8 becomes energized.

Contactor CR11 also becomes energized and this energizes the solenoid 28 which disengages the clutch 17 so as to disengage the normal drive on the work spindle from the main motor 12. A timing relay TR1 becomes energized and after a lapse of time if the work spindle is not in the correct position, through limit switch LS8, the coil of starting switch SM2 becomes energized to operate the work spindle positioning motor 25. As set forth above, the work spindle is then rotated in the opposite direction until the work is correctly positioned to permit loading at which time the limit switch LS8 is opened.

When the cutting is completed, the contactor CR12 is energized, the coil of the solenoid valve SV (up) becomes energized from the line L1 through the normally closed contact CR6, contact CR9 and contact CR12 which raises the saddle.

After a suitable time lapse determined by the setting of time relay TR2, which lapse allows the work spindle to be positioned, the contacts of TR2 disengage contactor CR9 and in turn contactor CR8 and then the operator proceeds to unload the completed work piece.

The hydraulic motor HM is continually energized to drive the pump P which operates in the manner described above.

As set forth above, other suitable and convenient means could be employed well within the scope of anyone skilled in the art to energize and move the various mechanical elements necessary for the present invention.

What I claim is:

1. In a gear shaper, a rotatable cutter spindle, means to reciprocate said cutter spindle, a rotatable work spindle, means to rotate said cutter spindle and work spindle in timed relation so as to suitably form a work piece held on the work spindle, means to disengage the means to rotate said work spindle, means responsive to actuation of said disengaging means to rotate the work spindle in a direction opposite to that given to said work spindle by said rotating means and means responsive to the completion of the cutting cycle to lift said cutter spindle an amount supplementary to that given to it by said reciprocating means.

2. In a gear shaper, a work spindle, means to rotate said work spindle in a given direction consisting of a main motor geared to said work spindle, a second motor geared to said work spindle, means to disengage the main motor from driving engagement with said work spindle, means to actuate said second motor upon disengagement of said main motor, means to deenergize said second motor after a given amount of rotation thereof, said means to deenergize said second motor comprising a rotary cam geared to rotate with said work spindle and a microswitch which is actuated by said cam.

3. In a gear shaper, a cutter spindle, a work spindle, means to drive said cutter spindle and work spindle in timed relation so as to generate teeth on a work piece held in the work spindle, means to disengage the drive to the work spindle, means responsive to actuation of said disengaging means operable to counter-rotate the work spindle and means responsive to completion of the cutting cycle to lift said cutter spindle out of engagement with said work piece.

4. In a gear shaper, a base, a sub-base mounted to move on said base, a cutter spindle saddle carried on said sub-base, a cutter spindle mounted in said saddle, a work spindle mounted in said base, means to rotate said cutter spindle and said work spindle in timed relation, means to reciprocate said cutter spindle and means responsive to the completion of the cutting cycle to move said sub-base away from said work spindle.

5. In a gear shaper, a base, a sub-base mounted to move on said base, a cutter spindle saddle carried on said sub-base, a cutter spindle mounted in said saddle, a work spindle mounted in said base, means to rotatively drive said cutter spindle and said work spindle in timed relation, means to reciprocate said cutter spindle, means responsive to the completion of the cutting cycle to move said sub-base away from said work spindle, means to disengage the drive to the work spindle and means operable in response to disengagement of the drive to said work spindle to rotate said work spindle in a direction opposite to that given by the aforesaid work spindle drive.

6. In a gear shaper, a rotatable cutter spindle, a rotatable work spindle, a geared drive between said cutter spindle and said work spindle arranged so as to impart relative generative movement between said cutter spindle and work spindle, a main drive motor to drive said gearing, a second motor geared to said work spindle, means to disengage said main drive motor from driving engagement with said work spindle, means to actuate said second motor upon disengagement of said main motor, means to de-energize said second motor after a given amount of rotation thereof, a cam, a clutch in said geared drive including a plurality of elements, gearing between said cam and one of said elements and a microswitch actuated by said cam adapted to de-energize said second drive motor.

7. In a gear shaper, a rotatable cutter spindle, a rotatable work spindle, means to drive said cutter spindle and work spindle in timed relation so as to generate teeth on a work piece held on the work spindle, means to disengage the drive to the work spindle, means responsive to actuation of said disengaging means operable to counter rotate the work spindle and means to render said counter rotating means inoperable when said work spindle has reached a given position, said last mentioned means including a rotary cam geared to rotate with said work spindle.

8. In a gear shaper a rotatable cutter spindle, a rotatable work spindle, a geared drive between said cutter spindle and said work spindle arranged so as to rotate said spindles in timed relation, a main motor connected to said geared drive to impart rotary motion to said spindles so as to generate teeth on a work piece held by the work spindle, a second motor geared to said work spindle to rotate the latter oppositely from said main motor, means to disengage said main motor from driving engagement with said work spindle, means responsive to actuation of said disengaging means to actuated said second motor and means to deenergize said second motor after a given amount of rotation thereof, said last mentioned means including a rotary cam geared to rotate with said work spindle.

References Cited in the file of this patent

UNITED STATES PATENTS

| | | |
|---|---|---|
| 879,531 | Fellows | Feb. 18, 1908 |
| 1,478,472 | Fellows | Dec. 25, 1923 |
| 2,549,324 | Miller | Apr. 17, 1951 |